United States Patent [19]

Levi et al.

[11] Patent Number: 4,899,849

[45] Date of Patent: Feb. 13, 1990

[54] LADDER STABILIZER

[75] Inventors: Avraham Y. Levi, St. Paul; Craig D. Quarberg, Brooklyn Park, both of Minn.

[73] Assignee: A. C. Innovations, Inc., Bloomington, Minn.

[21] Appl. No.: 280,124

[22] Filed: Dec. 5, 1988

[51] Int. Cl.⁴ .............................. E06C 5/36; E06C 1/22
[52] U.S. Cl. ..................................... 182/172; 182/111; 248/354.1
[58] Field of Search ............... 182/172, 169, 170, 111; 248/354.1

[56] References Cited

U.S. PATENT DOCUMENTS

| | | | |
|---|---|---|---|
| 46,105 | 1/1865 | Hayes | 182/172 |
| 485,900 | 11/1892 | Tannenberg | 182/172 |
| 1,135,763 | 4/1915 | Caronia | 182/172 |
| 1,235,696 | 8/1917 | Keith | 182/172 |
| 1,526,654 | 2/1925 | Yordy | 182/172 |
| 1,910,551 | 5/1933 | Kruse | 182/172 |
| 2,149,781 | 3/1939 | Leiser | 182/172 |
| 2,997,127 | 8/1961 | Wojtowicz | 182/172 |
| 3,878,917 | 4/1975 | McBride | 182/172 |
| 3,901,354 | 8/1975 | Grebausky | 182/172 |
| 4,433,754 | 2/1984 | Beach | 182/172 |

FOREIGN PATENT DOCUMENTS 1467900 12/1966 France .

Primary Examiner—Reinaldo P. Machado
Attorney, Agent, or Firm—Haugen and Nikolai

[57] ABSTRACT

Stabilizer apparatus for attachment to an extension ladder for inhibiting sideways tipping and downward/rearward slipping thereof. Attached to the opposed side rails of the ladder proximate the upper end of the lowermost section are hinge blocks for pivotally joining a pair of tubular, telescoping, extensible legs to the ladder. The hinge brackets are specially designed to permit the tubular legs to be swung parallel to and directly adjacent with the ladder's side rails when the ladder is to be stowed and which the legs to be rotated laterally outward and forward of the base of the ladder during use. An articulated brace extends between the pair of legs and their associated ladder side rails to limit the extent to which the legs may be splayed relative to the ladder.

8 Claims, 2 Drawing Sheets

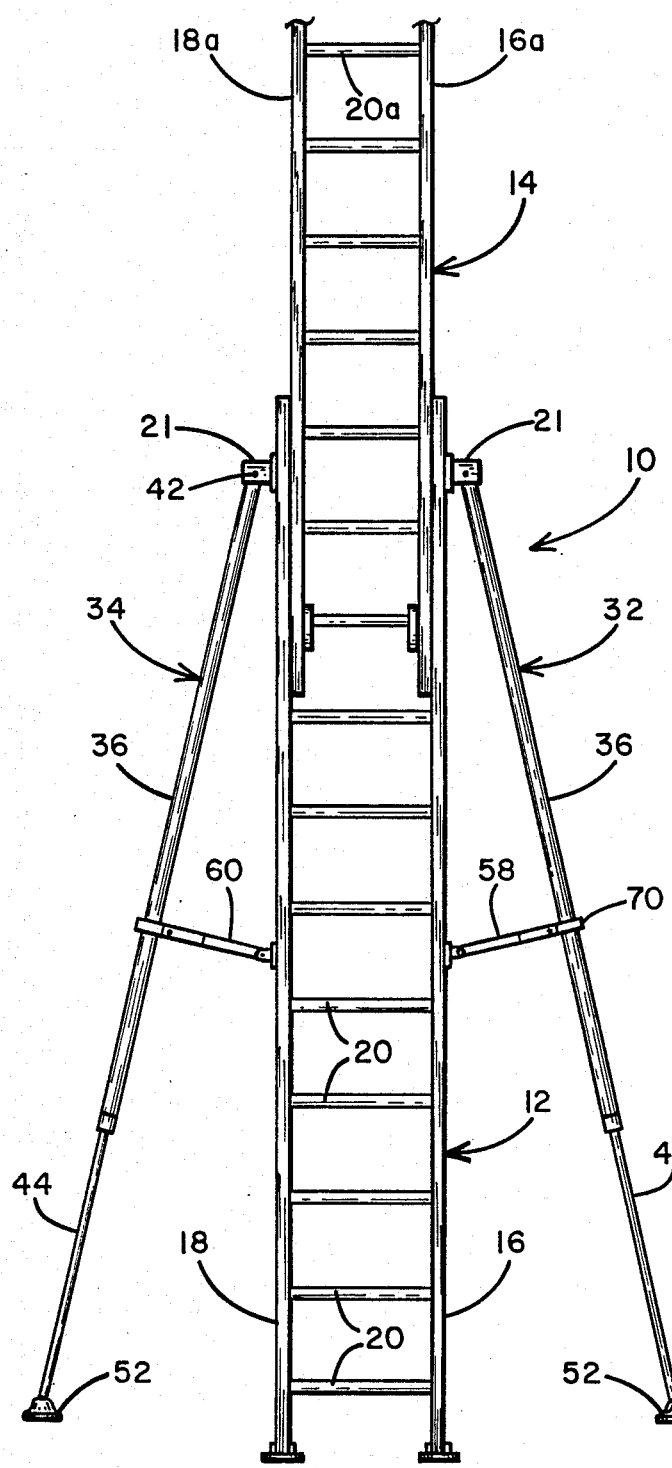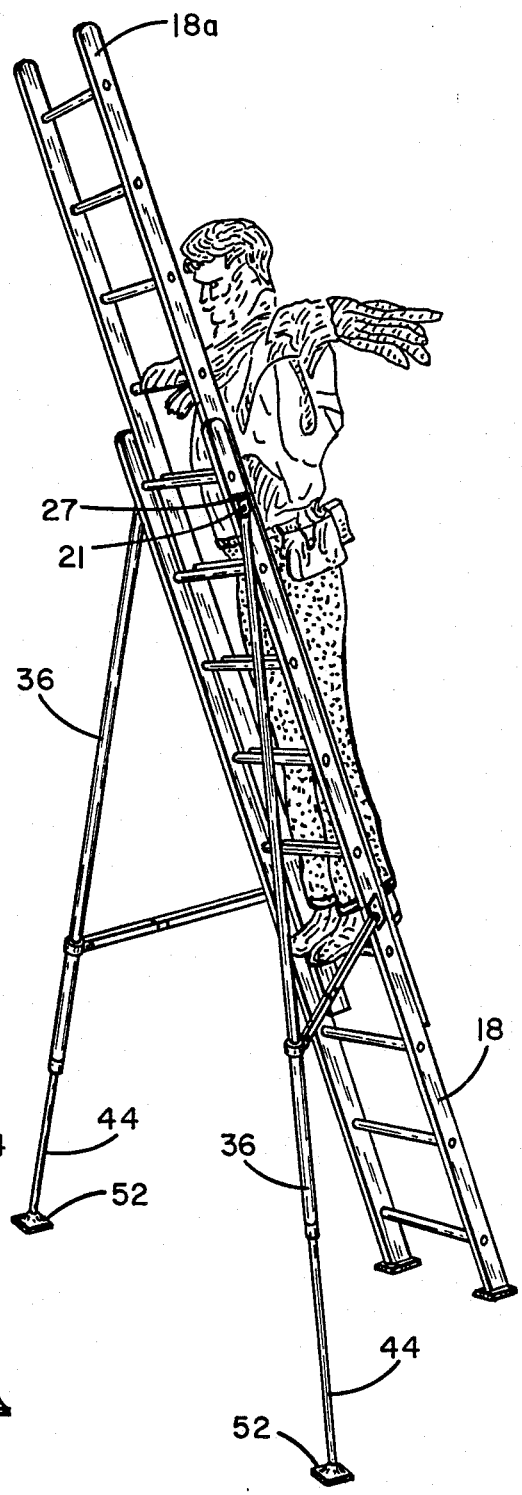
Fig. 1
Fig. 2

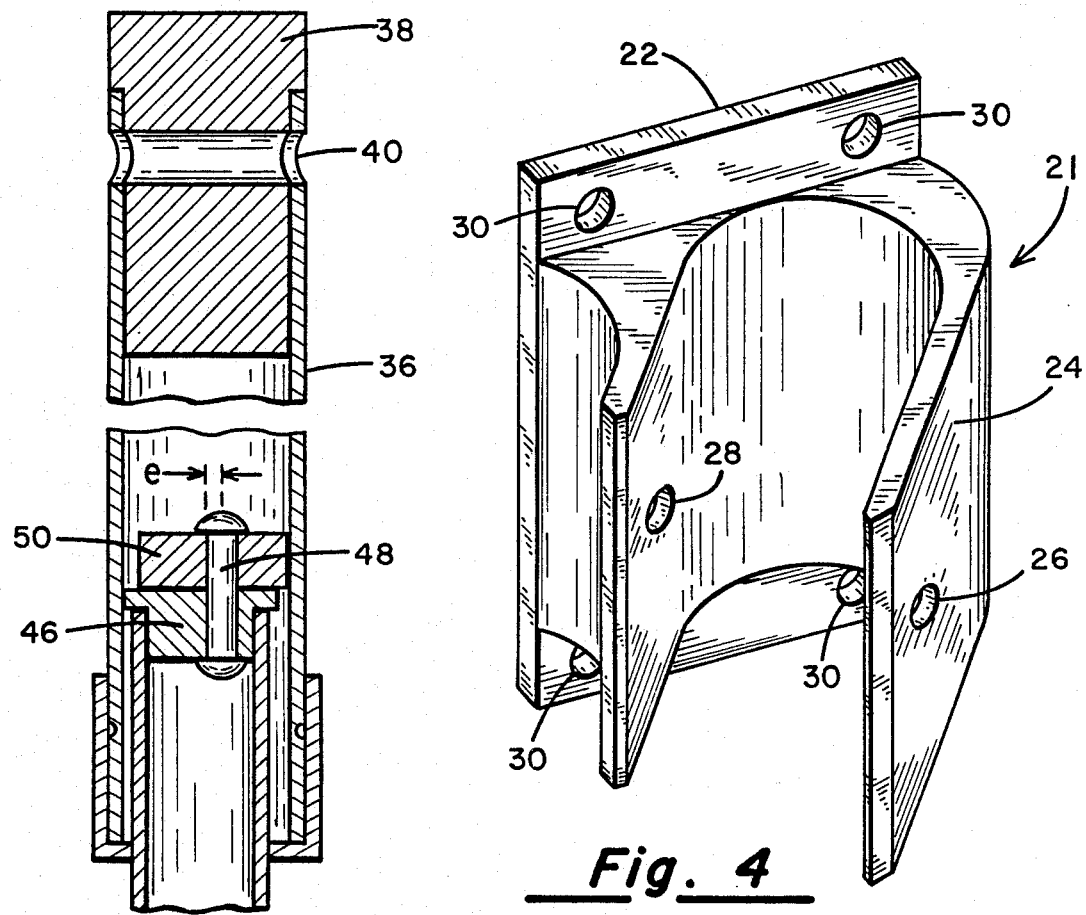
Fig. 4
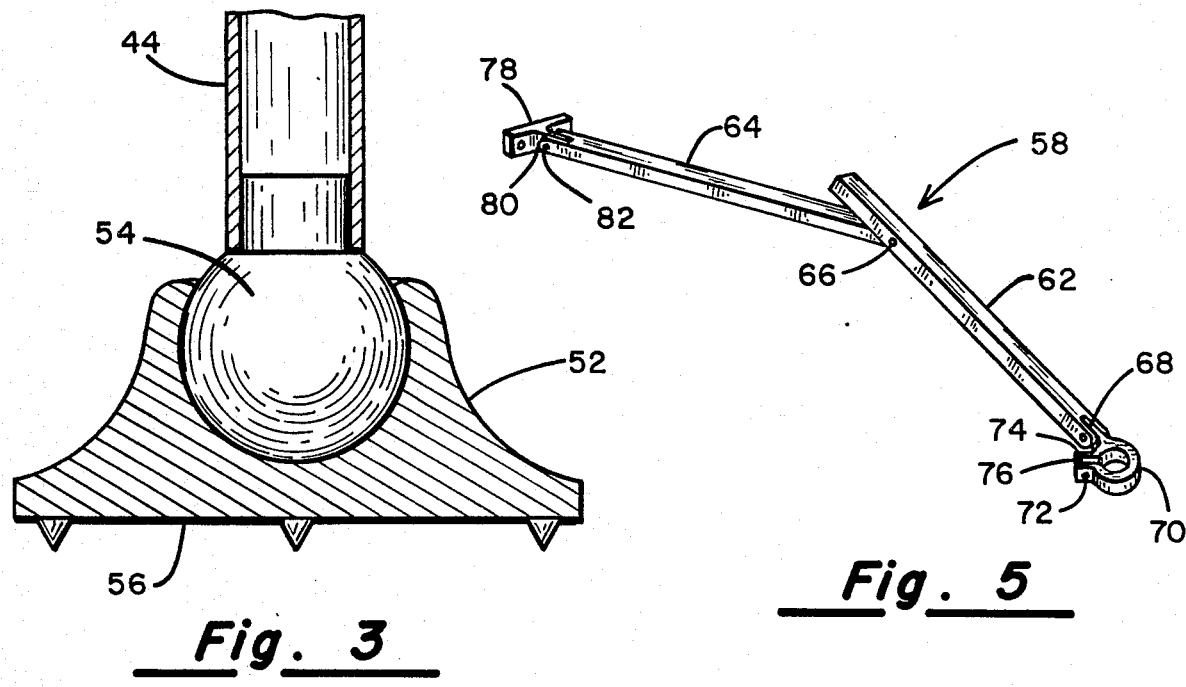
Fig. 3
Fig. 5

LADDER STABILIZER

BACKGROUND OF THE INVENTION

I. Field of the Invention

This invention relates generally to apparatus for stabilizing a two-legged ladder, such as an extension ladder, against tipping and sliding, and more particularly to a leg assembly attachable to the side rails of such a ladder and which, when deployed, provide a substantially wider base for same.

II. Discussion of the Prior Art

There are basically two styles of ladder presently in use, the two-legged extension ladder and the step ladder. The extension ladder generally comprises two or more sections which are coupled to one another to permit one to slide vertically relative to the other. This style of ladder has its base or lower end resting on a ground surface and its upper end leaning against a stationary object such as a wall or a roof eave. A step ladder, on the other hand, generally has four legs, two being arranged in a front leg frame supporting steps or rungs and two back legs joined as a frame which is hinged, usually to a top step, to form a A-frame. Having four spaced-apart feet, a step ladder need not be leaned against a wall and is generally free-standing.

In the case of an extension ladder, extreme care must be exercised when positioning it so that a person mounting the ladder does not create a force vector tending to cause the feet of the ladder to slide to the rear, i.e., away from the wall, with the upper end of the ladder sliding down the wall. This can usually be prevented by properly setting the angle that the ladder is tilted so that the major force vector caused by the load is primarily directly downward.

An extension ladder is also subject to lateral tipping, especially when the user is stretching out to the side more than he or she should to perform work. That is, rather than getting off the ladder and moving it, users often lean laterally outward from the side of the ladder and this can cause an over-balancing to the point where the ladder may tip over sideways. This problem is compounded further when the ladder's feet are not resting on a planar, horizontal surface. Where the terrain is uneven or soft, there is a tendency for the ladder to lean or shift to one side, thus making it easier to tip when the climber leans to that one side.

There is disclosed in the prior art the use of telescoping stabilizing legs fastened to the upper portion of a step ladder and laterally deployable at the lower end relative to the base of the step ladder. Such stabilizers are effective to limit over-balancing and tipping of such a ladder. Examples of such prior art stabilizing legs are depicted in the Wojtowicz U.S. Pat. No. 2,997,127, the McBride U.S. Pat. No. 3,878,917, the Beach U.S. Pat. No. 4,433,754 and the Grebausky U.S. Pat. No. 3,901,354.

To applicant's knowledge, no one has yet invented an effective stabilizing system for a two-legged extension-type ladder. While the Leiser U.S. Pat. No. 2,149,781 depicts an attachment designed for use with ladders to provide bracing of the ladder against lateral movement, it is not particularly effective because of the point at which the stabilizing legs are attached to the ladder rails. Moreover, the mechanism used to join the stabilizing legs to the rails is difficult to use in practice and does not afford convenient stowage of the stabilizing legs when the ladder is not in use.

Accordingly, it is a principal object of the present invention to provide an improved ladder stabilizer kit which may readily be connected to an extension-type ladder for rendering it safer to use.

Another object of the invention is to provide an extension ladder having a pair of telescoping tubular extensible legs hingedly joined to the side rails of the ladder at a location near the top of the lowermost ladder section where the stabilizing legs may be swung out laterally and forwardly relative to the ladder's feet.

A still further object of the invention is to provide safety equipment for an extension-type ladder for rendering that ladder more stable against either slipping out from the wall at its base or tipping laterally about one ladder leg.

SUMMARY OF THE INVENTION

The foregoing features and advantages are achieved by providing first and second hinge blocks which are easily attachable to the outer side surfaces of the side rails of a two-legged ladder, the hinge blocks being positioned near the upper ends of the side rails. Each of the hinge blocks includes a planar plate surface for abutting the side rails at the point of attachment and include an integrally formed, generally U-shaped channel projecting outwardly from the plate surface at a predetermined acute angle in the range of from 30 to 60 degrees. Aligned apertures are formed through the opposed sides of the U-shaped channel. The invention is further characterized by including first and second elongated, telescopingly extensible, tubular pole members which are individually connected at one end thereof to the first and second hinge blocks, respectively, by hinge pins passing transversely through the pole members and through the aforementioned aligned apertures. A cam lock is deployed between segments of the telescoping tubular pole members to facilitate adjustment of the length thereof. Furthermore, a folding brace member is attached to the tubular pole members at locations intermediate the upper and lower ends thereof and to the side rails of the ladder. These braces serve to limit the extent to which the stabilizing pole members can be spread relative to the side rails of the ladder. At the lower end of each of the stabilizing poles is a footpad which is capable of swiveling so as to become aligned with the ground or terrain surface which the pole members engage.

When the ladder with attached stabilizing legs is to be stowed, the stabilizing legs collapse against the side rails and can be readily clamped to the side rails by any convenient means. When the ladder is to be used in its desired vertical inclined orientation, the stabilizing legs may be deployed by swinging them laterally outward and forward of the ladder's feet, thereby establishing a much wider base and inhibiting the tendency of the ladder to tip sideways or to slide rearwardly.

The foregoing features and advantages of the invention will become more apparent to those skilled in the art from the following detailed description of a preferred embodiment, especially when considered in conjunction with the accompanying drawings in which like numerals in the several views refer to corresponding parts.

DESCRIPTION OF THE DRAWINGS

FIG. 1 is a front elevation view of an extension ladder incorporating the stabilizing leg assembly of the present invention;

FIG. 2 is a perspective view of the apparatus of FIG. 1;

FIG. 3 is a detailed cross-sectional view of a ladder stabilizing leg in accordance with the present invention;

FIG. 4 is a drawing of the hinge block; and

FIG. 5 is a detailed drawing of the folding brace used in the system of FIG. 1.

DESCRIPTION OF THE PREFERRED EMBODIMENT

Referring to FIG. 1, there is indicated generally by numeral 10 an extension ladder assembly incorporating the stabilizing apparatus of the present invention. The extension ladder itself comprises a first, lower section 12 and a second, upper section 14, it being understood that additional ladder extension sections may be added. Moreover, it should be readily apparent that the invention may be applied only to a single ladder section such as section 12 alone.

Each ladder section includes a pair of side rails 16–18 which are maintained in a predetermined space relationship from one another by a series of transversely extending rungs 20. The extension ladder itself is altogether conventional and includes the usual rope and pulley arrangement for raising and lowering the extension sections 14 relative to the base ladder section 12. That rope and pulley arrangement is not illustrated in FIG. 1 in order to eliminate needless lines. Moreover, the ladder sections may be fabricated from a variety of materials including wood, aluminum and aluminum alloys.

Referring to FIG. 2, attached proximate the upper end of the ladder section 12 is a hinge block 20, the detailed configuration of which is best seen in perspective view of FIG. 4. With reference to that figure, it is seen to include a generally planar surface 22 having an integrally formed U-shaped channel 24 projecting outwardly from the surface 22 at a predetermined acute angle lying in the range of from 30° to 60°. It is found that an angle of 45° is preferred. Formed through the outwardly projecting side surfaces of the U-shaped channel are circular apertures 26 and 28 which are horizontally aligned. The bracket 20 may readily be fastened to the opposed side rails 16 and 18 of the ladder section by bolts, as at 28 (FIG. 2), passing through the drilled apertures 30 formed in the planar surface of the bracket 20 and through mating apertures formed through the side rails of the ladder.

Fitted into the U-shaped channel of each of the brackets are first and second elongated, telescopingly extendable tubular pole members 32 and 34, the constructional details of which may best be seen in the cross-sectional view of FIG. 3. With reference to that figure, the poles each comprises and upper larger diameter tube 36 having a solid, reinforcing plug 38 fitted into the upper end thereof and transversely drilled at 40 for receiving a hinge pin 42 (FIG. 1) passing through the aligned apertures 26 and 28 of the hinge blocks 20.

Telescopingly receiving within the central portion of the tube 36 is a second tube 44 of a lesser diameter so that it is free to move reciprocally within the central opening of the tubular leg segment 36. A plug member 46 is press-fit into the upper end of the lower tubular member 44 and a pin 48 passes through a bore in the plug 46 that is offset from the center of the plug by a distance, e. The pin 48 also is made to pass through the center of a circular cam 50 and thus the distance, e, comprises the eccentricity of the cam. By rotating the lower tube 44 within the ID of the upper tube 36, the cam 50 can be made to tightly engage the interior wall of the tube 36 locking the leg segment 44 relative to the upper leg segment 36. Likewise, by rotating the lower leg portion 44 in the opposite direction from the locked position, it will free-up the two, allowing the lower tubular segment 44 to be easily moved either upward or downward within the upper tube 36 to accommodate the use of the ladder on uneven terrain and to accommodate differing ladder heights/inclinations.

Further enhancing the ability to stabilize the ladder is the use of footpads 52 which are fastened by a ball swivel connection 54 to the lowermost end of the lower tubular segment 44. The planar undersurface 56 of the pad 52 can be brought into intimate contact with either smooth or irregular terrain when the stabilizing leg assemblies 32 and 34 are splayed laterally outward and forward of the base of the ladder 12.

To limit the extent to which the leg members 32 and 34 can be extended, folding brace members 58 and 60 are coupled between the upper tubular segments 36 and the ladder's side rail 16 and 18, all as shown in FIG. 1. FIG. 5 is a more detailed view of the folding brace member itself. With reference to that figure, it is seen to comprise an extruded metal or plastic channel 62 and a rigid bar 64 which are hinged together by a hinge pin 66 passing through aligned apertures in the members 62 and 64, respectively. The other end of the channel 62 is pivotally secured to an outwardly projecting ear 68 which is integrally formed with a clamping collar 70 designed to fit around the circumference of the tubular segment 36 and held tight by a bolt passing through a bore 72 and into a mating threaded bore not shown on the ear 74 on the opposite side of the gap 76 from the bore 72. The other end of the bar 64 is likewise pivotally coupled to the ladder side rails 16 and 18 by a bracket 78 which is fastened to the ladder and which has an outwardly projecting ear 80 extending at a predetermined angle for forming a clevis connection with the bar 64 when a pin 82 is passed through aligned apertures in the bar and the ear 80 of the bracket.

Because of the overlap of the channel 62 with the bar 64, the folding brace members 58 and 60 can only fold through a 180° angle. When the braces 58 and 60 when viewed in FIG. 1 are lifted upward, the stabilizing leg assemblies 32 and 34 can be made to collapse against the ladder rails 16 and 18 and can be fastened thereto by a Bungee ™ cord or some other type of suitable clamp when being transported or stored.

In use, the stabilizing legs are swung out to the limit allowed by the folding braces 58 and 60 and because of the construction of the hinge 20, the pads 52 will be splayed laterally outward from the ladder's feet as shown in FIG. 1 and forward of the ladder's feet as illustrated in FIG. 2. The length of the stabilizing legs 32 and 34 are readily adjusted by appropriately rotating the lower leg segments 44 until the cam lock 50 releases and then sliding the tubular pole segments 44 upward or downward relative to the leg segments 36. Then, by again rotating the lower leg portions, the eccentric cam lock 50 comes into play to tightly join and lock the two legged segments to one another, preventing sliding of the lower segment relative to the upper.

It should be readily obvious to persons skilled in the art viewing FIGS. 1 and 2 that the stabilizing legs of the present invention greatly resists any tendency for the ladders to tip to the side even when the individual climbing the ladder is leaning a considerable distance to the side when performing work. Moreover, because the leg assemblies also swing forward relative to the ladder rails, it also inhibits any tendency for the base of the ladder to shift to the rear and greatly insures that the ladder will be inclined at an appropriate angle to resist such slippage before the user ascends same.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. Stabilizer apparatus for supporting a two-legged ladder against lateral and rearward movement, comprising in combination:
   (a) first and second hinge blocks attachable to the outer side surfaces of the side rails of a two-legged ladder proximate the upper ends thereof, each of said hinge blocks including a planar plate surface for abutting said outer side surfaces of said side rails and with an integrally formed, generally U-shaped channel projecting outwardly from said plate surface at a predetermined acute angle, there being aligned apertures formed centrally through the opposed sides of said U-shaped channel;
   (b) first and second elongated, telescopingly extendible, tubular pole members individually connected at one end thereof to said first and second hinge blocks, respectively, by hinge pins passing transversely through said pole members and said aligned apertures; and
   (c) a folding brace member attached to said tubular pole members at a location immediate said one and other ends of said tubular pole members and to said side rails of said ladder for limiting the extent to which said first and second pole members can be spread relative to said side rails of the ladder to which said pole members are hinged.

2. The stabilizer apparatus as in claim 1 wherein said first and second tubular members each include at least two segments joined in telescoping relation and means for releasibly locking said two segments together upon rotation of one segment relative to the other segment by a predetermined amount.

3. The stabilizer apparatus as in claim 1 and further including first and second footpad members being coupled by a swivel connection to the other end of said first and second tubular pole members, respectively.

4. The stabilizer as in claim 1 wherein said folding brace member includes:
   (a) a pair of straight bar segments pivotally joined to one another;
   (b) a clamp for surrounding one of said tubular pole members and having an integrally formed projection hingedly connected to one end of one of said straight bar segments; and
   (c) a clevis member attachable to a side rail of said ladder to one end of the other of said straight bar segments.

5. A ladder assembly comprising:
   (a) a pair of longitudinally extending rails held together in parallel, spaced-apart relation by a plurality of parallel, transversely extending, spaced-apart rung;
   (b) a pair of hinge brackets secured to said rails, each including a U-shaped leg receiving channel oriented at a predetermined acute angle with respect to said rail;
   (c) a pair of elongated, multi-segment, telescopingly-extendable and retractable legs having one end of each pivotally secured in a respective one of said leg-receiving channels of said pair of brackets whereby said legs can be selectively collapsed against said rails for storage or extended laterally outward and forward of said rails at said predetermined angle to support said rails in a desired inclined vertical disposition resistent to lateral rotational movement of said rails during use.

6. The ladder assembly as in claim 5 and further including footpad means swivel mounted to the lower ends of said pair of legs.

7. The ladder assembly as in claim 5 and further including a locking cam operatively coupled between segments of said multi-segment telescopingly-extendable and retractable legs for selectively locking adjacent segments against longitudinal movement relative to one another.

8. The ladder as in claim 5 and further including folding brace means coupled between said rails and said legs to limit the extent to which said legs can be spread relative to said rails.

* * * * *